Nov. 20, 1973   F. W. SPILLERS   3,773,870
TUBING IRRADIATION PROCESS
Original Filed April 18, 1967   2 Sheets-Sheet 2
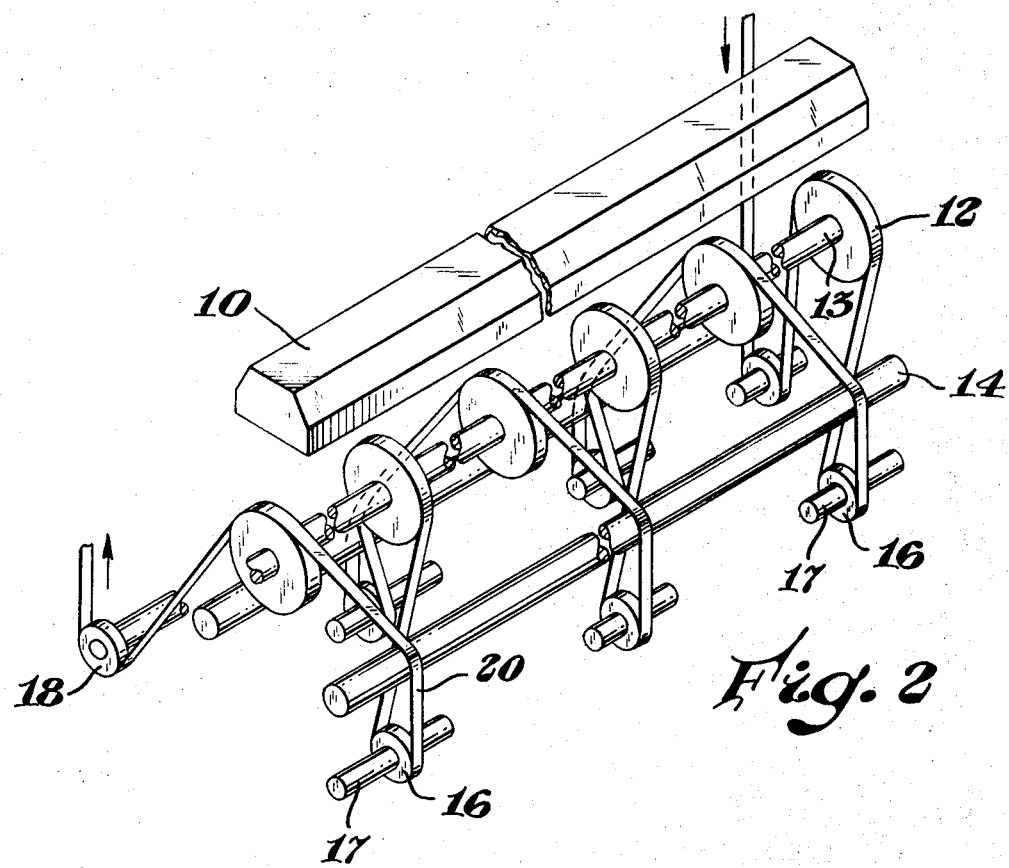
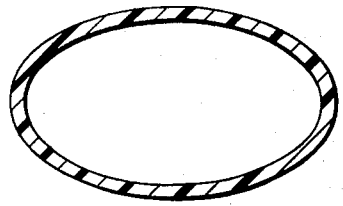
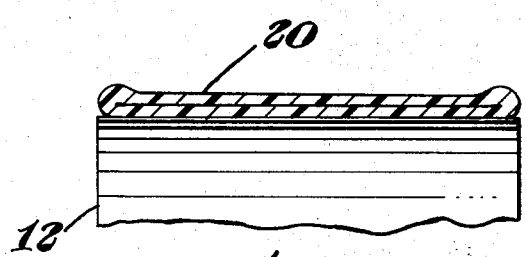
INVENTOR.
Frank W. Spillers
BY
Griswold & Burdick
ATTORNEYS United States Patent Office 3,773,870
Patented Nov. 20, 1973

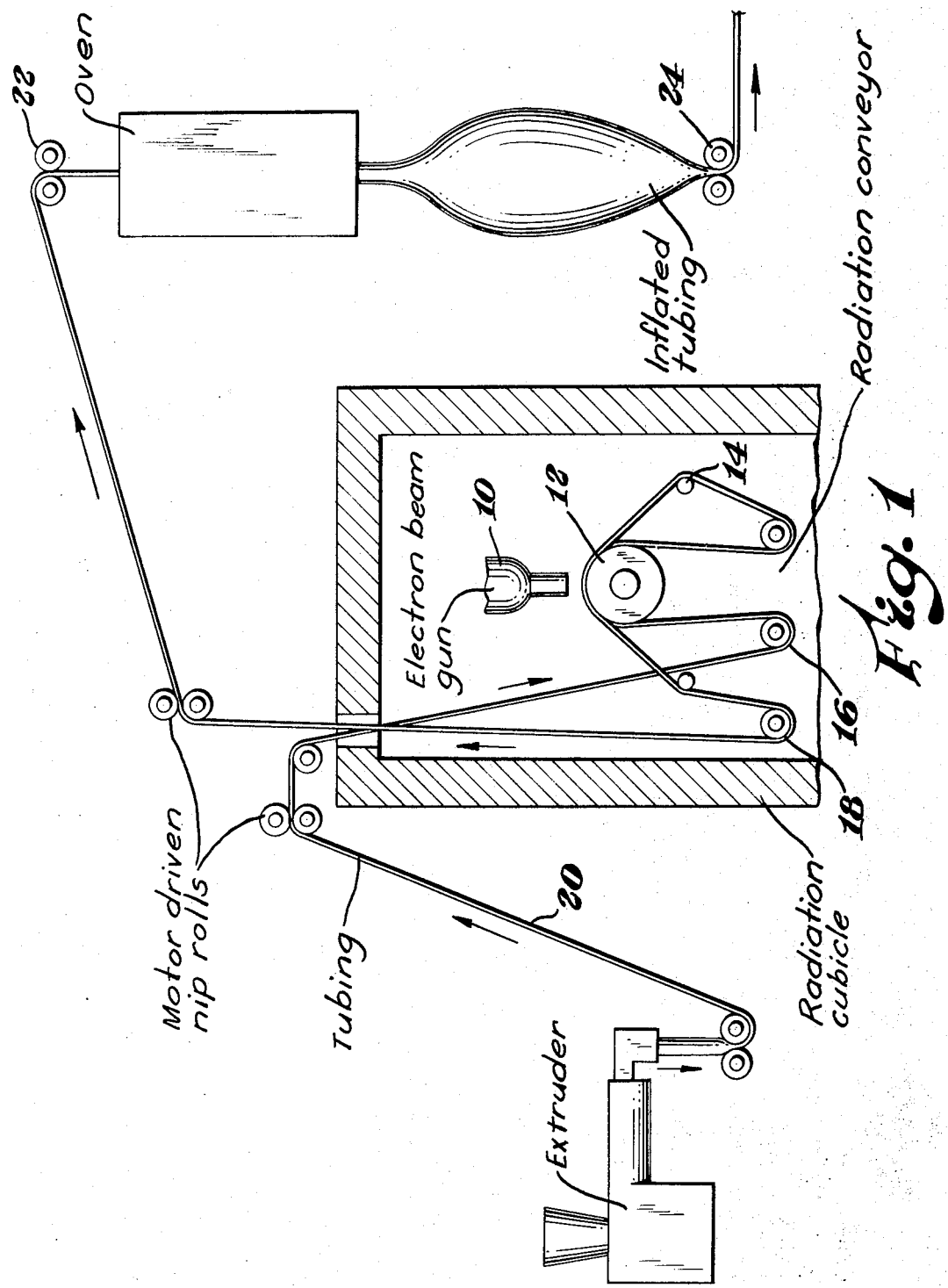

3,773,870
TUBING IRRADIATION PROCESS
Frank W. Spillers, Lake Jackson, Tex., assignor to The Dow Chemical Company, Midland, Mich.
Continuation of appplication Ser. No. 861,208, July 14, 1969, which is a continuation of application Ser. No. 631,793, Apr. 18, 1967, both now abandoned. This application Aug. 13, 1971, Ser. No. 171,756
Int. Cl. B29d 23/04
U.S. Cl. 264—22        6 Claims

ABSTRACT OF THE DISCLOSURE

A process for irradiating plastic tubing such that the dosage imparted to the tubing is uniform as to depth and area. The tubing is passed to a flattening zone, then to an irradiation zone, then reversed, inverted, and the sequence is repeated a plurality of times. The flattening zone comprises a flat roller or equivalent means. The irradiation zone comprises an electron beam gun or an equivalent irradiation source. The reversing and inverting is accomplished by a series of wheels and guide rollers arranged adjacent to the flat rollers.

---

This is a continuation of application Ser. No. 861,208 filed July 14, 1969 which was a continuation of application Ser. No. 631,793 filed Apr. 18, 1967 both of which are now abandoned.

BACKGROUND

This invention relates to a process for the uniform irradiation of plastic tubing, such as tubing of polyethylene and copolymers of ethylene.

It is known that in order to prepare bilaterally oriented films of polymers of ethylene (heat shrink films) one can first melt and extrude a relatively thick (4–60 mils) continuous tube of the plastic, cool it, irradiate it with electrons, X-rays, gamma rays, beta rays or ultraviolet light, and then heat and stretch it lengthwise and laterally (U.S. Pat. 3,126,680). It has been a problem of long standing in this art to provide a method and/or apparatus which will provide a uniform dosage of irradiation to the tubing. One suggested attempt to provide a solution to this problem has been the use of balls or cylinders of radioactive material within the tubing in conjunction with an external source of radiation (U.S. Pat. 3,027,312). Another suggested attempt to provide a solution has been the use of a main cathrode ray generator working in conjunction with an auxiliary generator (U.S. Pat. 2,724,059). Another suggested technique has been to use multiple passes of the tubing under an electron beam gun having a circular pattern to ensure uniform dosage (U.S. Pat. 2,914,450).

SUMMARY

It has been observed that even with an electron beam gun having a uniform transverse pattern (see U.S. Pat. 2,602,751) the irradiation of tubing passing through the beam is not uniform by the processes of the prior art or else the cost of the equipment for the uniform dosage processes are too high to warrent use in high volume production runs of the desired heat shrink film.

More specifically, when a plastic tubing is irradiated by a single electron beam generator by passing it a plurality of times under the beam, the creaseline of the flattened tubing (which is where the tube folds back on itself) does not receive a uniform dosage of irradiation because ionization is not uniform in depth. This results in areas of little or no cross linking which when the tube is biaxially oriented produces corresponding areas of thin spots or non-uniformity in the film. This is highly undesirable since the shrink film is used to package meat products to a large extent. These products are subject to rough handling in the market place and these weak spots or thin spots are a potential source of punctures and the subsequent contamination and/or spoilage of the product.

It has been observed that when the tubing is passed over two spaced rolls and under an electron beam gun located between said rolls as in the prior art, the tubing does not remain flat but assumes an elliptical cross section due to its inherent resiliency and the pressure of the hydrogen gas which is generated inside the tubing during the irradiation operation. This invariably results in areas of low dosage at the crease line of the tubing since the ionization efficiency of an electron beam varies widely from the distance to the generator. Thus, 60 percent of the maximum ionization occurs at the surface of a substrate, 100 percent ionization occurs at one third the total depth of penetration, and little or no ionization occurs at the maximum depth of penetration.

Now, in accordance with this invention, it has been found that if the tubing is completely flattened in the zone of irradiation a substantially uniform dosage of ionization is achieved. This flattening is accompilshed by passing the tubing over a flat roller directly under the electron beam generator. An alternate method and/or apparatus to accomplish the desired flattening, is to use a plurality of pairs of vertically spaced flat plates arranged directly under the electron beam generator so as to receive the irradiation. These plates are spaced a predetermined vertical distance apart so that when the tubing passes therethrough, it is completely flattened. These plates are somewhat wider than the flattened tubing and have an opening or a series of openings in the upper plate as wide as the width of the flattened tubing so as to permit full and direct irradiation of the tubing as it passes through the irradiation zone in flattened state. A further alternate method to accomplish the desired flattening is to create a vacuum inside the plastic tubing by compressing it against a stationary plate by means of a pair of idle rollers mounted on opposite ends of an arm rotating about a powered shaft at the middle of the arm in a direction opposite to the feed of the tubing. This is accomplished just prior to the irradiation. It is preferred to use the flat rollers for the flattening step since this is more economical. For the purposes of this invention, the terms "flattened state" or "flattened" means that the top section of the tubing is in actual contact with the lower half. Thus, the flattening rollers are considered to be the primary rollers and the secondary rollers are the associated rollers which reverse and direct the tubing through the flattening and irradiation zone the required or desired number of times to achieve the desired uniform irradiation or ionization.

DESCRIPTION OF THE DRAWING

The features and advantages of this invention may be best understood by reference to the accompanying drawings.

FIG. 1 shows a schematic diagram of the overall process and apparatus.

FIG. 2 shows an expanded isometric view of the details of the conveyor within the radiation cubicle.

FIG. 3 shows a cross-sectional view of the tubing of the prior art as it went through the irradiation zone.

FIG. 4 shows a cross-sectional view of the tubing of this invention as it is flattened on the roller of the irradiation zone.

DESCRIPTION OF THE PREFERRED EMBODIMENT

In FIG. 1, the overall process is illustrated to produce a bi-laterally oriented film. The relatively thick (30 mils) tubing 20 coming from the extruder is cooled, e.g. in a water bath or water spray (not shown), and conveyed by the nip rollers to the radiation cubicle. In this cubicle, an electron beam gun 10, e.g. of the type disclosed by the patent to Robinson 2,602,751, is arranged so that several passes of the tubing 20 are irradiated and ionized as they are flattened on the flat primary rollers 12 mounted directly under the electron beam gun 10. This area thus constitutes a flattening zone followed by an irradiation zone. The tubing 20 is passed under the gun 10 a plurality of times. The number of passes is always an even number so each side of the tubing is exposed to the electron beam the same number of times. It has been found in practice when using an electron beam gun operation at one million volts with a power output of 4800 watts a dosage of between ½ and 1.5 megareps is obtained for each pass. The voltage can vary from 100 kv. to 10 million volts in actual practice and the dosage range can vary from ½ to 20 megareps, desirably between about 3 and about 8 megareps. When operating within the desired range, it has been found that six passes under the gun 10 achieved the desired results. Obviously, the number of passes can be varied by those skilled in the art to suit the available equipment or the dosage per pass which is desired. The tubing 20 is guided by guide rollers 14 to the reversing wheels 16 and back to the gun 10 a plurality of times such as 3 or 5 times.

After passing back out the cubicle, the now irradiated tubing 20 is heated in an oven and blown up over a trapped gas bubble in a manner well known to the art. At the same time the tubing is given this lateral stretch, the nip rolls 24 are giving it a longitudinal stretch due to the fact that they are moving three times faster than the nip rolls 22 mounted over the oven. Thus, the tubing 20 is given a bi-lateral orientation by the time it passes rollers 24.

In FIG. 2, and expanded view of the radiation conveyor is shown. For clarity of illustration, the details of the conveyor have been expanded along the axis of the shaft 13 on which the flat rolls 12 are mounted. In actual practice, the rolls 12 are mounted closely together directly under the gun 10. The guide rollers 14 are mounted below and on either side of the shaft 13. The inverting wheels 16 are independently mounted below the guide rolls 14 on shafts or axes 17 which are not parallel to the axes of the guide rollers. These shafts 17 diverge horizontally at an acute angle to the centerline of the guide rolls 14 so that the tubing is receiving from one flat roller 12, reversed, and diverted slightly so that it will feed on to the next adjacent flat roller. For purposes of keeping FIG. 2 relatively simple, this divergent aspect of the shafts or axes has not been shown. The exact acute angle used for this purpose is obvious to a skilled mechanic. The last reversing wheel 18 feeds the irradiated tubing from the last flat roll 12 up and out of the cubicle.

It is thus seen that the rollers and wheels of the irradiation conveyor are not powered but are driven by the friction of the tubing passing over them.

The plastic tubing used in this process and apparatus can be made of polyethylene and polypropylene; copolymers of ethylene with propylene, isobutylene, amylene, acetylene, butadiene, and butene-1 and butene-2; and terpolymers of ethylene, propylene and vinyl esters such as the acetate, propionate, butyrate.

During production runs using the processes and apparatus of the prior art, U.S. Pats. 3,022,543 and 2,914,450 it was found that the thickness of the finished film varied from 27.6 percent over the nominal thickness of 1.52 mils to 25 percent under the nominal thickness. When the present invention was used these figures were reduced to 6.9 percent over and 10 percent under the nominal thickness. This is a variation of about ±8 percent which is well within the ± 10 percent variation which is acceptable to the food packaging industry.

What is claimed is:

1. A continuous method for the uniform high energy irradiation of plastic tubing which comprises the steps of:
   (a) forming said tubing in an extrusion zone,
   (b) passing said tubing into a high energy irradiation zone having an irradiation source,
   (c) flattening completely said tubing in said irradiation zone with a mechanical flattening means,
   (d) irradiating said tubing as said tubing is maintained in a completely flattened state by said flattening means, and
   (e) repeating steps (c) and (d) at the same distance from said irradiation source.

2. The continuous method according to claim 1 wherein the mechanical flattening means is a flattening roller and the tubing is irradiated as it passes over said flattening roller.

3. The continuous method according to claim 1 wherein the mechanical flattening means is a plurality of flattening rollers and the tubing is repeatedly irradiated as it passes sequentially over said plurality of flattening rollers.

4. The continuous method according to claim 1 comprising the steps of:
   (a) forming said tubing in an extrusion zone,
   (b) passing said tubing into an irradiation zone having an irradation source,
   (c) flattening completely said tubing in said irradiation zone with a mechanical flattening means so as to form a top side and a bottom side,
   (d) irradiating said top side of said tubing as said tubing is maintained in said completely flattened state by said flattening means,
   (e) inverting and reversing said tubing,
   (f) flattening completely said tubing in said irradiation zone with said mechanical flattening means, and
   (g) irradiating said bottom side of said tubing as said tubing is maintained in said completely flattened state and at the same distance from the irradiation source by said flattening means.

5. The method as set forth in claim 4 wherein said tubing is inverted and reverse three times.

6. The method as set forth in claim 4 wherein said tubing is inverted and reversed five times.

References Cited
UNITED STATES PATENTS

| | | | |
|---|---|---|---|
| 3,022,543 | 2/1962 | Baird et al. | 264—22 |
| 3,333,032 | 7/1967 | Dickinson | 264—22 |
| 3,330,748 | 7/1967 | Lawton | 204—159.14 |
| 2,956,904 | 10/1960 | Hendricks | 204—159.14 |

ROBERT F. WHITE, Primary Examiner

R. R. KUCIA, Assistant Examiner

U.S. Cl. X.R.

264—210